United States Patent [19]
Gupta et al.

[11] Patent Number: 5,852,133
[45] Date of Patent: Dec. 22, 1998

[54] CURABLE COMPOSITIONS CONTAINING 1, 3,5-TRIAZINE CARBAMATES AND EPOXY COMPOUNDS

[75] Inventors: Ram Baboo Gupta, Bronx, N.Y.; Kuang Jong Wu, Easton, Conn.

[73] Assignee: Cytec Technology Corp., Wilmington, Del.

[21] Appl. No.: 705,472

[22] Filed: Aug. 29, 1996

Related U.S. Application Data

[60] Provisional application No. 60/002,950, Aug. 30, 1995.

[51] Int. Cl.$^6$ .................................................. C08F 8/32
[52] U.S. Cl. ....................... 525/375; 525/327.3; 525/533
[58] Field of Search ................................ 525/533, 327.3, 525/375

[56] References Cited

U.S. PATENT DOCUMENTS

| | | | |
|---|---|---|---|
| 2,872,427 | 2/1959 | Schroeder | 260/29.2 |
| 3,730,930 | 5/1973 | Labana | 260/23 EP |
| 3,752,870 | 8/1973 | Labana | 260/836 |
| 3,781,380 | 12/1973 | Labana et al. | 260/836 |
| 3,787,521 | 1/1974 | Labana et al. | 260/836 |
| 4,011,381 | 3/1977 | Iwasawa et al. | 526/56 |
| 4,181,642 | 1/1980 | Hölle et al. | 260/37 EP |
| 4,344,876 | 8/1982 | Berner | 524/91 |
| 4,346,144 | 8/1982 | Craven | 428/335 |
| 4,426,471 | 1/1984 | Berner | 524/91 |
| 4,435,559 | 3/1984 | Valko | 528/73 |
| 4,607,069 | 8/1986 | Tesch et al. | 523/400 |
| 4,619,956 | 10/1986 | Susi | 524/87 |
| 4,650,718 | 3/1987 | Simpson et al. | 428/413 |
| 4,681,811 | 7/1987 | Simpson et al. | 428/413 |
| 4,703,101 | 10/1987 | Singer et al. | 528/87 |
| 4,764,430 | 8/1988 | Blackburn et al. | 428/413 |
| 4,855,386 | 8/1989 | Bauer | 528/117 |
| 4,939,213 | 7/1990 | Jacobs, III et al. | 525/329.9 |
| 5,001,173 | 3/1991 | Anderson et al. | 523/406 |
| 5,075,370 | 12/1991 | Kubitza et al. | 524/591 |
| 5,084,541 | 1/1992 | Jacobs, III et al. | 528/45 |
| 5,106,891 | 4/1992 | Valet | 524/91 |
| 5,116,892 | 5/1992 | Barbee et al. | 524/99 |
| 5,118,729 | 6/1992 | Piechocki | 523/404 |
| 5,288,865 | 2/1994 | Gupta | 544/200 |
| 5,322,868 | 6/1994 | Valet et al. | 524/89 |
| 5,342,878 | 8/1994 | Das et al. | 524/558 |
| 5,461,151 | 10/1995 | Waterman | 544/216 |
| 5,462,992 | 10/1995 | Wilt et al. | 525/375 |
| 5,565,243 | 10/1996 | Mauer et al. | 427/407.2 |
| 5,596,047 | 1/1997 | Wu et al. | 525/375 |

FOREIGN PATENT DOCUMENTS

| | | |
|---|---|---|
| 0256369 A2 | 2/1988 | European Pat. Off. |
| 0434608 A1 | 6/1991 | European Pat. Off. |
| 0444323 A2 | 9/1991 | European Pat. Off. |
| 0480120 A2 | 4/1992 | European Pat. Off. |
| 0568134 A1 | 11/1993 | European Pat. Off. |
| 0604922 A1 | 7/1994 | European Pat. Off. |
| 0624577 A1 | 11/1994 | European Pat. Off. |
| 0649842 A1 | 4/1995 | European Pat. Off. |
| 0663413 A2 | 7/1995 | European Pat. Off. |
| 0704437 A2 | 4/1996 | European Pat. Off. |
| 1530022 | 10/1978 | United Kingdom . |
| WO 92/19660 | 11/1992 | WIPO . |
| WO 94/06876 | 3/1994 | WIPO . |
| WO 95/30663 | 11/1995 | WIPO . |
| WO 96/04258 | 2/1996 | WIPO . |
| WO 96/11915 | 4/1996 | WIPO . |
| WO 96/15185 | 5/1996 | WIPO . |

OTHER PUBLICATIONS

H. Sehovic, et al., "Poly–2–Oxazolidone–Urethane Coatings," *J. Coat. Technology*, vol. 59, No. 747, pp. 29–35 (Apr. 1987).

T. I. Kadurina, et al., "Curing of Epoxy Oligomers by Isocyanates," *Polymer*, vol. 33 (18), pp. 3858–3864 (1992).

Y. Iwakura and S–I. Izawa, "Glycidyl Ether Reactions with Urethanes and Ureas. A New Synthetic Method for 2–Oxazolidones," *J. Org. Chem.*, vol. 29, pp. 379–382 (Feb. 1964).

*Primary Examiner*—Veronica P. Hoke
*Attorney, Agent, or Firm*—Pennie & Edmonds LLP

[57] ABSTRACT

Curable compositions which include a 1,3,5-triazine carbamate crosslinker and a polyfunctional epoxy resin as well as their uses in coatings are disclosed. The compositions may additionally contain a co-crosslinker and/or a polyfunctional hydroxy group containing material. Reduction in the formaldehyde emission levels relative to aminoplast resin based coatings can be achieved without loss of the ultimate film properties.

49 Claims, No Drawings

CURABLE COMPOSITIONS CONTAINING 1,3,5-TRIAZINE CARBAMATES AND EPOXY COMPOUNDS

BACKGROUND OF THE INVENTION

This application claims priority under 35 U.S.C. §119 from U.S. Provisional application Ser. No. 60/002,950 (filed Aug. 30, 1995), which is incorporated by reference herein as if fully set forth.

FIELD OF THE INVENTION

The present invention relates generally to a curable composition containing a 1,3,5-triazine carbamate crosslinker and a polyfunctional epoxy compound, preferably suitable for use in coatings. The invention also relates to a method of preparing such coatings and to articles coated therewith.

DESCRIPTION OF THE RELATED ART

Traditional industrial coatings have for years been based in significant part on backbone resins having active hydrogen groups crosslinked with various derivatives of amino-1,3,5-triazines. Most notable among the amino-1,3,5-triazine derivatives are the aminoplasts such as the alkoxymethyl derivatives of melamine and guanamines which, while providing excellent results in a number of aspects, have the disadvantage of releasing formaldehyde as a volatile by-product under curing conditions.

Despite the excellent films which can be achieved with aminoplast crosslinked systems, the coatings industry is under great pressure to reduce the environmentally undesirable emission of formaldehyde. As a result, it has long been a desire of industry to find acceptable alternative crosslinkers and coatings systems which do not emit formaldehyde upon cure.

One approach by industry to avoid formaldehyde emissions has been the use of epoxy group-containing compounds cured with, for example, polyamine and/or polyacid crosslinking agents. While such epoxy-based systems are in general formaldehyde free and can produce films and other crosslinked objects with a number of desirable physical characteristics, such systems do suffer from several disadvantages including, for example, toxicity of the crosslinkers (particularly the polyamines), poor light stability and excessive yellowing of the cured films upon exposure to the elements, and difficulty in formulating stable one-can systems due to the extreme reactivity of the epoxy group with the amino and carboxyl functional groups of the crosslinking agents.

It would, therefore, be highly desirable to provide a curable composition based upon an epoxy-functional resin which retains the many advantages of epoxy-based systems but, at the same time, overcomes at least in part the toxicity, stability and formulation problems mentioned above.

SUMMARY OF THE INVENTION

In accordance with the present invention, such an advantageous epoxy-based curable composition has been found which comprises, in its overall concept:

(1) a resin component comprising a polyfunctional epoxy compound, and (2) a crosslinker component comprising a 1,3,5-triazine carbamate. These curable compositions in accordance with the present invention may be utilized in a wide variety of fields. A particularly preferred end use is as a one- or two-component sprayable coating for elevated temperature cure applications such as, for example, automotive OEM clearcoats and coil coatings.

As compared with traditional aminoplast crosslinked systems, the curable compositions of the present invention can be formulated to significantly reduce or even eliminate formaldehyde emissions on cure while retaining many of the advantageous physical properties of aminoplast crosslinked systems. The present systems also retain many of the advantageous physical properties of epoxy-based systems, while significantly improving the resistance and formulating disadvantages inherent to such systems. Particularly, the curable compositions of the present invention provide crosslinked films or objects possessing advantageous acid etch resistance, chemical resistance, hydrolysis resistance and durability, are relatively low in toxicity, can be formulated as stable one-can systems, as liquid and powder systems, and can be formulated for lower temperature cure (100° C. to 140° C.) applications.

These and other features and advantages of the present invention will be more readily understood by those of ordinary skill in the art from a reading of the following detailed description.

DETAILED DESCRIPTION OF THE PREFERRED EMBODIMENTS

The Crosslinker Component

As indicated above, the crosslinkers component comprises a 1,3,5-triazine carbamate. In addition, the crosslinker component may optionally comprise a co-crosslinker such as an aminoplast resin (e.g., an alkylated melamine-formaldehyde condensate), blocked and unblocked polyisocyanates, and traditional epoxy resin crosslinkers such as polyamines and polyacids.

In the present specification, by 1,3,5-triazine carbamate is meant a compound based on one or more 1,3,5-triazine cores having on average at least two carbamate groups attached to such core or cores. Such 1,3,5-triazine carbamates and methods for preparing the same are known, for example, from commonly owned U.S. Pat. No. 4,939,213, U.S. Pat. No. 5,084,541, U.S. Pat. No. 5,288,865, EP-A-0604922 (corresponding to U.S. application Ser. No. 07/998,313, filed Dec. 29, 1992) now U.S. Pat. No. 5,574,103, EP-A-0624577 (corresponding to U.S. application Ser. No. 08/061,905 filed May 14, 1993) now abandoned, EP-A-0649842 (corresponding to U.S. application Ser. No. 08/138,581, filed Oct. 15, 1993), WO95/30663 (corresponding to U.S. application Ser. No. 08/239,009, filed May 6, 1994) now U.S. Pat. No. 5,556,971, WO96/04258 (corresponding to U.S. application Ser. No. 08/286,835, filed Aug. 5, 1994), WO096/11915 (corresponding to U.S. application Ser. No. 08/324,549, filed Oct. 18, 1994) and WO96/15185 (corresponding to U.S. application Ser. No. 08/340,950, filed Nov. 16, 1994) now U.S. Pat. No. 5,596,047, all of which are hereby incorporated by reference herein for all purposes as if fully set forth.

Preferred for use in the present invention are those 1,3,5-triazine carbamates of the following general formula, as well as oligomers thereof:

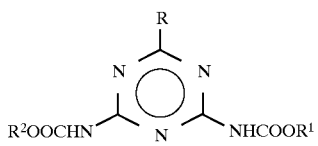

wherein R is selected from the group consisting of —NHCOOR³, hydrogen, hydrocarbyl, hydrocarbyloxy, hydrocarbylthio, amido, sulfonamido, amino, hydrocarbylamino, dihydrocarbylamino and cyclic amino; and wherein each $R^1$, $R^2$ and $R^3$ is independently selected from the group consisting of hydrocarbyl and hydrocarbyloxyhydrocarbyl. The term "hydrocarbyl" in the context of the present invention, and in the above formula, is a group which contains carbon and hydrogen atoms and includes, for example, alkyl, aryl, aralkyl, alkenyl, and substituted derivatives thereof.

In the more preferred embodiments, R is selected from the group consisting of —NHCOOR³; hydrogen; a hydrocarbyl group having from 1 to 20 carbon atoms such as alkyl (e.g., methyl and butyl), cycloalkyl (e.g., cyclohexyl), alkenyl (e.g., vinyl), aryl (e.g. phenyl), aralkyl (e.g., benzyl) and the like; a hydrocarbyloxy group having 1 to 20 carbon atoms such as alkoxy (e.g., methoxy), aryloxy (e.g., phenoxy) and the like; hydrocarbylthio groups having 1 to 20 carbon atoms such as methylthio, phenylthio and the like; amido groups such as acetamido; sulfonamido groups such as benzenesulfonamido; an amino group (e.g., —$NH_2$); hydrocarbylamino groups having 1 to 20 carbon atoms such as methylamino, butylamino and the like; dihydrocarbylamino groups having 2 to 40 carbon atoms such as dimethylamino; and cyclic amino groups such as pyrrolidino, piperidino, morpholino, azepino and the like. Crosslinkers wherein R is —NHCOOR³ are especially preferred.

As preferred $R^1$, $R^2$ and $R^3$ groups may be mentioned, for example, hydrocarbyl groups having 1 to 20 carbon atoms such as alkyl (e.g., methyl and butyl), cycloalkyl (e.g., cyclohexyl), alkenyl (e.g., vinyl), aryl (e.g. phenyl), aralkyl (e.g., benzyl) and the like; and hydrocarbyloxyhydrocarbyl groups having 2 to 40 carbon atoms with the hydrocarbyl group being as described above. Further, these groups may also have a substituent such as a halogen atom, a cyano group, a sulfoxide group, a sulfone group, a carbonyl group, an ester group and an amide group. Mixtures of the above are also suitable.

More preferred of the above for $R^1$, $R^2$ and $R^3$ are the aliphatic alkyls and alkenyls having 1 to 8 carbon atoms, cyclic alkyls and alkenyls having 4 to 12 carbon atoms, alkoxyalkyls having 2 to 16 carbon atoms, and aryl and alkaryls having 6 to 18 carbon atoms, as well as mixtures thereof. As specific preferred examples may be mentioned methyl, ethyl, propyl, n-butyl, i-butyl, t-butyl, pentyl, hexyl, cyclohexyl, heptyl, octyl, ethylhexyl, allyl, ethoxyethyl, 1-methoxy-2-propyl, phenyl, 2-methylphenyl, 3-methylphenyl, 4-methylphenyl, dimethylphenyls, 2-chlorophenyl, 3-chlorophenyl, 4-chlorophenyl and mixtures thereof.

Especially preferred 1,3,5-triazine carbamate crosslinkers for use in this invention are those of the above formula wherein R is —NHCOOR³, and wherein $R^1$, $R^2$ and $R^3$ are independently alkyls having 1 to 8 carbon atoms, and particularly methyl and/or butyl, which includes which includes tris-(butoxycarbonylamino)-1,3,5-triazine, tris-(methoxycarbonylamino)-1,3,5-triazine and tris-(methoxybutoxycarbonylamino)-1,3,5-triazine. As a preferred example of the latter may be mention such a 1,3,5-triazine carbamate crosslinkers having a methyl to butyl molar ratio in the range of from about 0.50 to about 1.5 (as determined by Nuclear Magnetic Resonance (NMR) spectroscopy), and particularly those having methyl to butyl ratios in the range of from about 0.65 to about 1.2.

These 1,3,5-triazine carbamates may be prepared, for example, by the methods described in the previously incorporated U.S. Pat. No. 4,939,213, U.S. Pat. No. 5,084,541, U.S. Pat. No. 5,288,865, EP-A-0604922 (corresponding to U.S. application Ser. No. 07/998,313, filed Dec. 29, 1992), EP-A-0624577 (corresponding to U.S. application Ser. No. 08/061,905 filed May 14, 1993), EP-A-0649842 (corresponding to U.S. application Ser. No. 08/138,581, filed Oct. 15, 1993), WO95/30663 (corresponding to U.S. application Ser. No. 08/239,009, filed May 6, 1994), WO96/04258 (corresponding to U.S. application Ser. No. 08/286, 835, filed Aug. 5, 1994), WO96/11915 (corresponding to U.S. application Ser. No. 08/324,549, filed Oct. 18, 1994) and WO96/15185 (corresponding to U.S. application Ser. No. 08/340,950, filed Nov. 16, 1994), and reference may be had thereto for further details.

In addition to the 1,3,5-triazine carbamate crosslinkers described in detail above, the crosslinker component may optionally comprise a variety of additional ingredients. For example, the crosslinker component may optionally contain other crosslinking agents, referred to herein as "co-crosslinkers," which include, particularly, active-hydrogen and epoxy reactive crosslinking agents such as, for example, aminoplast resins, blocked and/or unblocked polyfunctional isocyanates, and traditional epoxy crosslinkers such as polyamines and polyacids.

As suitable aminoplast resins may be mentioned the partially or substantially fully methylolated, partially or substantially fully etherified amino compounds based on melamine, guanamines, glycolurils and urea. In general, such aminoplast resins are well known to those of ordinary skill in the art (see, for example, previously incorporated EP-A-0604922) and are generally available commercially. Most commonly, they include melamines, guanamines such as benzo-, aceto- and cyclohexylcarbo-guanamines, glycolurils and ureas, as well as the at least partially N-alkylolated and N-alkoxyalkylated derivatives thereof. The term "aminoplast resin" also includes the oligomers of such amino compounds.

As suitable melamine-based aminoplast resins may be mentioned those of the following general formula

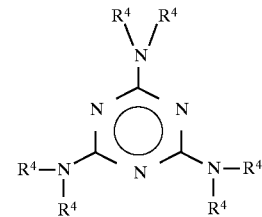

wherein each $R^4$ is independently selected from H, an alkylol group and an alkoxyalkyl group. Preferred melamines are those wherein each $R^4$ is independently selected from H, a methylol group and an alkoxymethyl group having from 1 to 8 carbon atoms in the alkoxy group.

As suitable guanamine-based aminoplast resins may be mentioned those of the following general formula

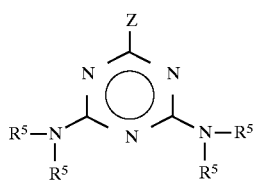

wherein Z is selected from H, an alkyl group of from 1 to 20 carbon atoms, an aryl group of from 6 to 20 carbon atoms, and an aralkyl group of from 7 to 20 carbon atoms, and wherein each $R^5$ is independently selected from H, an alkylol group and an alkoxyalkyl group. Preferred guanamines are those wherein each $R^5$ is independently selected from H, a methylol group and an alkoxymethyl group having from 1 to 8 carbon atoms in the alkoxy group, and particularly wherein Z is selected from a phenyl group (benzoguanamines), a methyl group (acetoguanamines) and a cyclohexyl group (cyclohexylcarboguanamines).

As suitable glycoluril-based aminoplast resins may be mentioned those of the following general formula

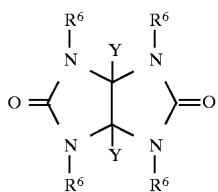

wherein Y is selected from H, an alkyl group of from 1 to 20 carbon atoms, an aryl group of from 6 to 20 carbon atoms, and an aralkyl group of from 7 to 20 carbon atoms, and wherein each $R^6$ is independently selected from H, an alkylol group and an alkoxyalkyl group. Preferred glycolurils are those wherein each $R^6$ is independently selected from H, a methylol group and an alkoxymethyl group having from 1 to 8 carbon atoms in the alkoxy group.

As suitable urea-based aminoplast resins may be mentioned those of the following general formula

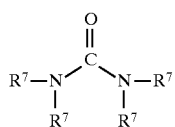

wherein each $R^7$ is independently selected from H, an alkylol group and an alkoxyalkyl group. Preferred ureas are those wherein each $R^7$ is independently selected from H, a methylol group and an alkoxymethyl group having from 1 to 8 carbon atoms in the alkoxy group.

As specific examples of commercially available aminoplast resins of the type described above may be mentioned those sold under the trademarks CYMEL® and BEETLE® of Cytec Industries Inc. (West Paterson, N.J.).

Polyisocyanate crosslinking agents, including blocked forms thereof, are generally well known in the art and have been extensively used in coating compositions in a monomeric, oligomeric and/or polymeric form, and preferably contain at least two reactive isocyanate groups. As specific examples of such may be mentioned hexamethylene diisocyanate; 2,2,4-trimethylhexamethylene diisocyanate; 2,4,4-trimethylhexamethylene diisocyanate; meta-α,α,α',α'-tetramethylxylylenediisocyanate (commercially available under the trade designation m-TMXDI® aliphatic isocyanate from Cytec Industries Inc., West Paterson, N.J.); para-α,α,α',α'-tetramethylxylylenediisocyanate (available under the trade designation p-TMXDI® aliphatic isocyanate from Cytec Industries Inc., West Paterson, N.J.); 1-isocyanato-3,3,5-trimethyl-5-isocyanatomethyl cyclohexane (isophorone diisocyanate, abbreviated as IPDI); bis(4-isocyanatocyclohexyl)methane (hydrogenated MDI); biuret derivatives of various diisocyanates including, for example, hexamethylene diisocyanate (commercially available under the trade designation Desmodur® N of Miles Inc., Pittsburgh, Pa.); uretdione derivatives of various diisocyanates including, for example, hexamethylene diisocyanate and IPDI; isocyanurate derivatives of various diisocyanates including, for example, hexamethylene diisocyanate (commercially available under the trade designation Desmodur® N 3390 of Miles Inc., Pittsburgh, Pa.) and IPDI (commercially available under the trade designation IPDI® T 1890 polyisocyanate of Huls America, Inc., Piscataway, N.J.); and urethane adducts of diisocyanates with polyols such as, for example, ethylene glycol, propylene glycol, neopentyl glycol, trimethylolpropane, pentaerythritol and the like, as well as oligomeric and polymeric polyols, for example, the 3:1 meta-α,α,α',α'-tetramethylxylylenediisocyanate/trimethylolpropane adduct (commercially available under the trade designation CYTHANE® 3160 aliphatic polyisocyanate of Cytec Industries Inc., West Paterson, N.J.), and the 3:1 IPDI/trimethylolpropane adduct (commercially available under the trade designation SPENLITE® P 25-A4-60 aliphatic urethane prepolymer of Reichhold Chemicals, Research Triangle Park, N.C.).

The polyisocyanates may be blocked in a well-known manner with, for example, lower alkyl alcohols and oximes.

Polyamine crosslinking agents for epoxy resins are also well-known to those of ordinary skill in the art and include, for example, aromatic amines such as 4,4'-diaminodiphenylmethane, 3,3'-and 4,4'-diaminodiphenylsulfone, 3,3'- and 4,4'-diaminodiphenyloxide, 3,3'- and 4,4'-diaminodiphenylsulfide, 3,3'- and 4,4'-diaminodiphenylketone, 4,4'-[1,4-phenylene-(1-methylethylidene)]-bisbenzeneamine, 1,4-phenylenediamine, 2,2-bis(4-aminophenyl)hexafluoropropane, 2,2-bis(3-amino-4hydroxyphenyl)hexafluoropropane, 3,4-diaminodiphenyloxide, 9,9-bis(4-aminophenyl)fluorene, 4,4'-diaminobenzanilide, 9,10-bis(4-aminophenyl)anthracene, 2,2-bis(4-[3-aminophenoxy]phenyl)sulfone, 2,2-bis(4-[4-aminophenoxy]phenyl)sulfone, 1,4-bis(4-aminophenoxy)biphenyl, bis(4-[4-aminophenoxy]phenyl)ether, 2,2-bis(4-[4-aminophenoxy]phenyl)propane and 2,2-bis([4-(4-amino-2-trifluorophenoxy)]phenyl)hexafluoropropane; and primary and secondary aliphatic polyamines such as diethylene triamine, triethylene tetraamine, tetraethyl pentamine and ethylene diamine. Also include are amino-terminated polyarylene oligomers wherein the repeating phenyl groups are separated by either sulfide, carbonyl, sulfone carbonate or the like groups, such as amino-terminated polyarylenesulfones, polyaryleneethersulfones, polyetherketones, polyetheretherketones and like variants; and polyoxyalkylene polyamines such as polyoxypropylene diamines and triamines. These and other examples can be found in U.S. Pat. No. 2,872,427, U.S. Pat. No. 4,607,069, U.S. Pat. No. 4,855,386, U.S. Pat. No. 5,118,729 and WO94/06876, all of which are incorporated by reference herein for all purposes as if fully set forth.

Polyacid crosslinking agents for epoxy resins are likewise generally known and include, for example, monomeric polycarboxylic acids and anhydrides, and oligomeric and polymeric reaction products of such monomeric polycarboxylic acids and anhydrides with, for example, various monomeric and oligomeric polyols. Specific examples of such polyacid crosslinking agents for both liquid and powder systems can be found in U.S. Pat. No. 2,872,427, U.S. Pat. No. 3,730,930, U.S. Pat. No. 3,752,870, U.S. Pat. No. 3,781,380, U.S. Pat. No. 3,787,521, U.S. Pat. No. 4,011,381, U.S. Pat. No. 4,346,144, U.S. Pat. No. 4,650,718, U.S. Pat. No. 4,681,811, U.S. Pat. No. 4,703,101, U.S. Pat. No. 4,764,430, U.S. Pat. No. 5,116,892 and WO92/19660, all of which are incorporated by reference herein for all purposes as if fully set forth.

The Resin Component

As indicated above, the resin component comprises a polyfunctional epoxy compound. In addition, the resin component may optionally comprise a polyfunctional active hydrogen group containing compound, such as a polyfunctional hydroxy group containing resin, to impart to the crosslinked system the desired properties.

The polyfunctional epoxy compound usable as the resin component in the curable compositions of the present invention contains, on average, at least two and preferably more than two epoxy functionalities per molecule, and includes polyfunctional epoxy group containing materials which are monomeric, oligomeric, polymeric or a mixture thereof. Such polyfunctional epoxy compounds are in general well-known to those of ordinary skill in the art, as exemplified by previously incorporated U.S. Pat. No. 2,872,427, U.S. Pat. No. 3,730,930, U.S. Pat. No. 3,752,870, U.S. Pat. No. 3,781,380, U.S. Pat. No. 3,787,521, U.S. Pat. No. 4,011,381, U.S. Pat. No. 4,346,144, U.S. Pat. No. 4,607,069, U.S. Pat. No. 4,650,718, U.S. Pat. No. 4,681,811, U.S. Pat. No. 4,703,101, U.S. Pat. No. 4,764,430, U.S. Pat. No. 4,855,386, U.S. Pat. No. 5,116,892, U.S. Pat. No. 5,118,729, WO92/19660 and WO94/06876, as well as U.S. Pat. No. 5,001,173 which is also incorporated by reference herein for all purposes as if fully set forth.

As specific examples of monomeric polyfunctional epoxy compounds may be mentioned difunctional epoxy resins (bisepoxides) including glycidyl ethers of dihydric phenols like the bisphenol-A/epichlorohydrin reaction products such as diglycidyl bisphenol-A; vinyl cyclohexene diepoxides such as 4-vinyl-1-cyclohexene diepoxide; 1,2,5,6-diepoxycyclooctane; 1,2,7,8-diepoxyoctane; dicyclopentadiene diepoxide; 1,4-divinyl benzene diepoxide; cyclohexene-4-methyl cyclohexene-4-carboxylate diepoxide; glycidylated diol type polyfunctional epoxy group containing materials such as hexane diol diglycidyl ether, ethylene glycol diglycidyl ether, diethylene glycol diglycidyl ether, triethylene glycol diglycidyl ether and the like. Other suitable monomeric polyfunctional epoxy compounds include trifunctional epoxy resins (trisepoxides) such as tri-(4-glycidyl oxyphenyl)methane and triglycidyl isocyanurate; and higher polyfunctional epoxides such as glycidylated pentaerythritol and sorbitol. As a commercially available example of bisphenol-A/epichlorohydrin reaction products may be mentioned epoxy resins sold under the trade designation Epon® of Shell Chemical Company (Houston, Tex.), such as Epon® 828 resin having an equivalent weight in the range of 185 to 192. As a commercially available example of a glycidylated sorbitol may be mentioned the substantially monomeric glycidylated sorbitol known as Synocure® 888 H resin (Cook Composites and Polymers Company, Port Washington, Wis.).

The oligomeric polyfunctional epoxy group containing materials include oligomeric forms of the monomeric materials, oligomers of diepoxides such as low molecular weight bis-phenol-A oligomers, prepolymers thereof, reaction products of amines with diepoxides, and the like.

The polymeric polyfunctional epoxy group containing materials include, for example, polymers of epoxy group containing unsaturated monomers and copolymers thereof with unsaturated comonomers which do not contain epoxy groups. As examples of the epoxy group containing unsaturated monomers may be mentioned glycidyl acrylate, glycidyl methacrylate and allyl glycidyl ether. As examples of the unsaturated comonomers which do not contain epoxy groups may be mentioned the alkyl esters of acrylic and methacrylic acid containing from 1 to 20 carbon atoms in the alkyl group, such as methyl acrylate, ethyl acrylate, butyl acrylate, ethylhexyl acrylate, methyl methacrylate, ethyl methacrylate, butyl methacrylate and ethylhexyl methacrylate; vinyl aromatic compounds such as styrene, methyl styrene and vinyl toluene; vinyl and vinylidine halides such as vinyl and vinylidene chlorides, vinyl esters such as vinyl acetate; allyl alcohol; and hydroxyalkyl acrylates and methacrylates containing from 1 to 20 carbon atoms in the hydroxyalkyl group, such as hydroxyethyl acrylate, hydroxyethyl methacrylate, hydroxypropyl acrylate, hydroxypropyl methacrylate and the like. The copolymerization reaction may be carried out by known methods such as that described in various of the aforementioned incorporated reference as well as in U.S. Pat. No. 3,787,521, U.S. Pat. No. 4,181,642, EP-A-0480120 and EP-A-0256369, which are also incorporated by reference herein as if fully set forth.

Commercially available examples of glycidyl methacrylate copolymer type polyfunctional epoxy group containing materials include Synthacryl® VCS 1436 resin a product of Hoechst-Celanese Corporation, Charlotte, N.C.; Estron® GMA-252 resin (Mw: 8300; EW: 250; Tg: 36), a product of Estron Chemicals, Calvert City, Ky.; Almatex® PD 6100 (Mw: 12500; EW: 1030; Tg: 63), Almatex® PD 6300, Almatex® PD 7110, Almatex® PD 7210, Almatex® PD 7310, Almatex® PD 7610 (Mw: 7000; EW: 510; Tg: 45) and Almatex® PD 1700 resins, products of Mitsui Toatsu Company, Inc. of Japan, and available from Anderson Development Company, Adrian, Mich.; and Blemmer® CP-15 (Mw: 12300; EW: 1000; Tg: 63), Blemmer® CP-30 P (Mw: 10300; EW: 530; Tg: 62) and Blemmer® CP-5 SA (Mw: 10100; EW: 3000; Tg: 96) resins, products of Nippon Oil and Fat Corporation of Japan.

As indicated above, the resin component may optionally include a polyfunctional active hydrogen group containing compound. Active hydrogen-containing functionality, as utilized herein, refers to functional groups which contain active hydrogens reactive with the epoxy groups of the polyfunctional epoxy compound and/or with the carbamate groups of the triazine carbamate (or functionality which may be generated by the carbamate groups under cure conditions, such as isocyanate functionality). Such active hydrogen functionality is in general well-known to those of ordinary skill in the art and includes, most commonly, hydroxyl, carboxyl and amino groups. When utilized herein, hydroxyl is preferred.

Suitable such polyfunctional hydroxy group containing materials are again generally well known to those skilled in the art, and contain at least two and preferably more than two hydroxy groups. Reference may be had to previously incorporated U.S. Pat. No. 4,939,213, U.S. Pat. No. 5,084,541, U.S. Pat. No. 5,288,865, EP-A-0604922 (corresponding to U.S. application Ser. No. 07/998,313, filed Dec. 29, 1992), EP-A-0624577 (corresponding to U.S. application Ser. No. 08/061,905 filed May 14, 1993), EP-A-0649842

(corresponding to U.S. application Ser. No. 08/138,581, filed Oct. 15, 1993), WO95/30663 (corresponding to U.S. application Ser. No. 08/239,009, filed May 6, 1994), WO96/04258 (corresponding to U.S. application Ser. No. 08/286,835, filed Aug. 5, 1994), WO96/11915 (corresponding to U.S. application Ser. No. 08/324,549, filed Oct. 18, 1994) and WO96/15185 (corresponding to U.S. application Ser. No. 08/340,950; filed Nov. 16, 1994), for further details.

As examples of preferred polyfunctional hydroxy group containing materials may be mentioned acrylic or polyester backbone resins. Illustrative examples include acrylic resins which may be obtained by the copolymerization of acrylic or methacrylic esters with hydroxyfunctional acrylic or methacrylic esters such as hydroxyethyl acrylate or methacrylate, optionally with simultaneous use of additional vinyl compounds such as, for example, styrene. Illustrative examples of the polyfunctional hydroxy group containing materials also include polyester resins which may be obtained, for example, by the reaction of polycarboxylic acids with excess quantities of polyhydric alcohols. Other suitable polyfunctional hydroxy group containing resins include polyurethane prepolymers, alkyds, as well as hydroxy group containing epoxy prepolymers such as those resulting from the reaction of a polyfunctional epoxy group containing compound with an amine or with a polyfunctional carboxylic acid derivative.

In general, such resins may have pendent or terminal hydroxyl functionalities and preferably have the following characteristics: weight average molecular weights (Mw) of from about 750 to about 7000, and more preferably from about 2000 to about 5000; and hydroxyl numbers of from about 20 to about 100 mg KOH/g resin, more preferably from about 25 to about 60 mg KOH/g resin, and especially from about 25 to about 40 mg KOH/g resin.

For waterborne applications, polyfunctional hydroxy group containing materials having thereon aqueous dispersion promoting groups such as carboxylic or sulfonic functionalities and higher molecular weights are generally usable, such as disclosed in previously incorporated U.S. application Ser. No. 08/340,950 (filed Nov. 16, 1994), as well as GB1530022, EP-A-0568134, EP-A-0663413, U.S. Pat. No. 5,075,370 and U.S. Pat. No. 5,342,878, all of which are further incorporated by reference herein as if fully set forth. Solid polyfunctional hydroxy group containing materials are suitable for use in powder coatings. For solvent borne coatings, liquid polyfunctional hydroxy group containing materials are preferred. However, solid polyfunctional hydroxy group containing materials may be used in cases when the solids are soluble in the solvent used in a particular formulation. Specific suitable hydroxyl functional resins will be readily recognized by those of ordinary skill in the art depending upon the desired end use.

Commercially available examples of polyfunctional hydroxy group containing materials include JONCRYL® 500 acrylic resin, a product of S. C.Johnson & Sons, Racine, Wis.; ACRYLOID® AT-400 acrylic resin, a product of Rohm & Haas, Philadelphia, Pa.; CYPLEX® 1531 polyester resin, a product of Cytec Industries, West Paterson, N.J.; CARGILL 3000 and 5776 polyester resins, products of Cargill, Minneapolis, Minn.; TONE® polyester resin, a product of Union Carbide, Danbury, Conn.; K-FLEX® XM-2302 and XM-2306 resins, products of King Industries, Norwalk, Conn.; CHEMPOL® 11-1369 resin, a product of Cook Composites and Polymers, Port Washington, Wis.; JONCRYL® 540 acrylic emulsion polymer, a product of S. C.Johnson & Sons, Racine, Wis.; RHOPLEX® AC-1024 acrylic emulsion resin, a product of Rohm & Haas, Philadelphia, Pa.; XC® 4005 water reducible acrylic resin, a product of Cytec Industries, West Paterson, N.J.; CRYL-COAT® 3494 solid hydroxy terminated polyester resin, a product of UCB CHEMICALS USA, Smyrna, Ga.; RUCOTE® 101 polyester resin, a product of Ruco Polymer, Hicksville, N.Y.; JONCRYL® SCX-800-A and SCX-800-B hydroxyfunctional solid acrylic resins, products of S. C.Johnson & Sons, Racine, Wis.); and ALFTALAT® AN 745 hydroxyfunctional polyester resin, a product of Hoechst Corporation.

Other Ingredients

In addition to the crosslinker and resin components described in detail above, the curable compositions of the present invention may optionally comprise a variety of additional ingredients normal for any particularly chosen end use.

One common such additional ingredient is a cure catalysts for increasing the cure rate and thereby reducing the cure temperature and/or cure time of the systems described herein. As examples of cure catalysts may be mentioned basic catalysts, organometallic catalysts and acidic catalysts.

As examples of basic catalysts may be mentioned quaternary onium compounds such as ammonium, phosphonium and sulfonium compounds, as well as salts thereof having a counterion such as hydroxide, alkoxide, aryloxide, carboxylate, carbonate and the like. As examples of quaternary onium salts may be mentioned quaternary ammonium salts, quaternary phosphonium salts and quaternary sulfonium salts. Of these, quaternary ammonium salts such as quaternary ammonium hydroxides, quaternary ammonium alkoxides, quaternary ammonium carboxylates and quaternary ammonium carbonates are preferred. Quaternary ammonium hydroxides such as benzyl trialkylammonium hydroxides are especially preferred.

As examples of other basic catalysts may be mentioned strong nitrogenous bases such as amines, imines, amidines and guanidines, and inorganic bases such as alkali metal salts. Suitable alkali metal salts include salts of lithium, sodium or potassium having a counterion such as hydroxide, alkoxide, aryloxide, carboxylate, carbonate and the like. Suitable amines include primary, secondary, and tertiary amines. Tertiary amines are preferred to primary and secondary amines and include trialkyl amines, triaryl amines, alkyl diaryl amines, dialkyl aryl amines, cyclic amines, bicyclic amines, polycyclic amines, heteroaromatic amines and mixtures thereof, including heteroaromatic amines such as 4-pyrrolidinopyridine, 4-piperidiropyridine, and 4-morpholinopyridine, and bicyclic amines such as 1,4-diaza-(2.2.2)-bicyclooctane (DABCO). Of these other basic catalysts, 1,4-diaza-(2.2.2)-bicyclooctane (DABCO) and alkylated guanidines such as tetramethylguanidine are preferred.

As examples of organometallic catalysts may be mentioned organotin compounds such as dibutyltin di-2-ethylhexoate, dibutyltin diisooctyl maleate, dibenzyltin di-2-ethylhexoate, dibutyltin dilaurate, dimethyltin dilaurate, tetrabutyl diacetoxy distannoxane, tetramethyl diacetoxy distannoxane, tetrapropyl diacetoxy distannoxane, dibutyltin dichloride and the like.

As examples of acidic catalysts may be mentioned sulfonic acids (such as p-toluene sulfonic acid or dodecyl benzene sulfonic acid), aryl and alkyl acid-phosphates and pyrophosphates, carboxylic acids, sulfonimides and mineral acids. Latent acidic catalysts, such as amine-blocked p-toluene sulfonic acid or amine-blocked dodecyl benzene sulfonic acid, are included within the meaning of acidic catalysts.

If an amino resin co-crosslinker is utilized with the 1,3,5-triazine carbamate crosslinker, an acid catalyst will be most suitable. If a polyisocyanate co-crosslinker is utilized with the 1,3,5-triazine carbamate crosslinker, a basic and/or an organometallic catalyst will be most suitable. If a 1,3,5-triazine carbamate crosslinker and a polyfunctional epoxy group containing material only are used, a quaternary catalyst such as benzyltrimethylammonium acetate, tetrabutylammonium acetate and tetrabutylammonium bromide would be most suitable. Again, however, cure catalysts are optional in the present systems and, when utilized, are generally added in amounts ranging from about 0.001 wt % to about 6.0 wt %, and preferably up to about 2.0 wt %, based on the combined weight of the backbone resin and crosslinker components (total resin solids).

The present curable compositions may also contain a solvent of the type typically found in coatings applications including, for example, alcohols, ketones, esters, aliphatic hydrocarbons, aromatic hydrocarbons, halogenated hydrocarbons and the like. In waterborne coating applications, the curable compositions may contain, in addition to water, a co-solvent and an aqueous dispersion promoting material such as ethylhexanol, Texanol® (a C8-hydroxyalkyl ester of methylpropionic acid commercially available from Eastman Chemical Company), surfactants and other related materials.

Other optional ingredients may be additionally used depending on the particular application. For example, well known auxiliaries and additives typically utilized in the coatings industry include foam inhibitors, levelling aids, pigments, dispersants such as pigment dispersing aids, dyes, UV absorbers (including hydroxy aryl triazine types (such as CYAGARD® UV 1164 of Cytec Industries Inc.), benzotriazole types and benzophenone types), heat stabilizers, other stabilizing additives such as antioxidants, hindered amine light stabilizers (such as Sanduvor® 3058 of Clariant) and the like. Other such optional ingredients have been exemplified in the many previously incorporated references, and reference may be had thereto for further details. Reference may specifically be had to U.S. Pat. No. 4,426,471, U.S. Pat. No. 4,344,876, U.S. Pat. No. 4,619,956, U.S. Pat. No. 5,106,891, U.S. Pat. No. 5,322,868, U.S. Pat. No. 5,461,151, EP-A-0434608, EP-A-0444323 and EP-A-0704437, all of which are incorporated by reference herein as if fully set forth, for detailed discussions of the stabilization of coatings and other curable compositions with UV absorbers, hindered amine light stabilizers and/or other types of light stabilizers.

Preparation and Uses of the Curable Compositions

The curable compositions of the present invention are suitable for numerous uses including, for example, as coatings and adhesives, in decorative laminated boards, and in the formation of crosslinked molded articles such as engineering composites. The curable compositions may be prepared by admixing the various components via methods and in relative amounts which are recognizable by those of ordinary skill in the art in the relevant field depending upon the particular end use chosen. As a general rule, the resin component and the crosslinker component should preferably be admixed in an equivalents ratio (equivalents of reactive functionality) of from about 0.5:1 to about 2:1, and more preferably from about 0.8:1 to about 1.2:1.

An especially preferred use of the curable compositions in accordance with the present invention is in the coatings field. Any conventional type of coating may be prepared using the curable compositions described herein, including organic solvent based liquid coatings, waterborne coatings and powder coatings. In coatings applications, the weight amounts of 1,3,5-triazine carbamate crosslinker and polyfunctional epoxy compound will be dependent upon factors including, for example, the particular materials chosen, the presence of other reactive species as well as the desired end use. Based upon these variables and others, those of ordinary skill in the art should be able to adjust the composition of the coatings (including the relative amounts of the components) to achieve the desired effect. It is, however, preferred that when the 1,3,5-triazine carbamate crosslinker and polyfunctional epoxy compound comprise the major reactive portion of the coating composition, they be present in a 1,3,5-triazine carbamate crosslinker to polyfunctional epoxy compounds equivalents ratio in the range of from about 0.5:1 to about 2:1, and especially in the range of from about 0.8:1 to about 1.2:1. When polyfunctional hydroxy group containing and/or co-crosslinkers are additionally employed, it is preferred that the overall crosslinker component to resin component equivalents ratio be within the above indicated ranges.

Organic solvent based liquid coatings in accordance with the present invention may be prepared via conventional means by adding into a commonly used organic coatings solvent the components of the curable composition and the optional ingredients, if present, in any convenient order. In organic solvent based coatings, the systems are formulated to produce a solids content level suitable for convenient application with minimal material loss, preferably at a solids content level in the range of from about 20 weight percent to about 85 weight percent, and more preferably at a solids content level in the range of from about 45 weight percent to about 80 weight percent, depending on the method of application chosen.

Waterborne coating compositions in accordance with the present invention may be prepared by combining the components of the coating in any particular order, but it is preferred to do so by preparing a dispersible composition by substantially homogeneously mixing the coating components with a surface active material (which may be an inherent property of the resin component), then dispersing the dispersible composition in an aqueous medium, which may comprise solely water or may contain other components such as minor amounts of water-miscible co-solvents to ease dispersion or adjust viscosity. The waterborne coating compositions may be formulated to various solids contents, generally ranging from about 20% to about 75% by weight solids, but preferably in the range of from about 30% to about 55% by weight solids, depending on the method of application chosen.

Powder coating compositions in accordance with the present invention may be prepared by any well-known method, for example, by dry mixing the components in a mixer or blender followed by compounding in an extruder and granulating, grinding and then screening to obtain a powder of suitable mesh size for powder coating. For powder coatings applications, compositions containing solid crosslinker and backbone resin components are preferred. Alternatively, some or all of the components may be dissolved in a solvent such as methylene chloride and spray dried by well known techniques. Moreover, it may be preferable to masterbatch the crosslinking agent and the hydroxyl functional resin prior to mixing the optional components of the composition in a manner well known to a person skilled in the art.

The present coating compositions are utilized by applying the coating to a substrate then curing the so-applied coating to form crosslinked films. Liquid coatings may be applied, for example, by dipping, spraying, padding, brushing, flowcoating, electrocoating or electrostatic spraying. After application, the liquid carrier (e.g., organic solvent and/or water) is generally allowed to partially evaporate to produce a uniform coating on the substrate. Powder coatings may be applied, for example, by means such as a powder gun, electrostatic deposition or deposition from a fluidized bed. After deposition, the powder is typically heated usually to a temperature sufficient to cause the particles to soften, melt, flow and begin to cure.

Full curing of the present coating compositions (and curable compositions) requires elevated temperatures generally in the range of from about 25° C to about 450° C. depending on the components as well as the end use application. In liquid coatings applications, the cure temperature is typically in the range of from about 80° C. to about 160° C. In powder coatings applications, the cure temperature is typically in the range of from about 110° C. to about 230° C., preferably from about 150° C. to about 220° C., and most preferably from about 170° C. to about 200° C. In coil coatings applications, the cure temperature is typically in the range of from about 250° C. to about 450° C. Cure time preferably is in the in the range of from about 1 second to about 30 minutes but may vary depending on the temperature chosen for cure. For example, a fully cured coil coating may be obtained by either curing at 260° C. for 1 minute or by curing at 417° C. for 20 seconds. Typical cure times for liquid and powder coatings are in the in the range of from about 5 minutes to about 30 minutes.

The coating compositions of this invention may be formulated for use in numerous areas such as original equipment manufacturing (OEM) including automotive coatings, general industrial coatings including industrial maintenance coatings, architectural coatings, can coatings and the like. They are usable as coatings for wire, appliances, automotive parts, furniture, pipes, machinery, and the like. The present systems can replace 1K urethane coatings in applications such as acid etch resistant automotive finishes, powder coatings, coil coatings including base coats and top coats. Suitable surfaces include metals such as steel and aluminum, plastics, wood, and glass.

The examples which follow are intended to be illustrative of certain preferred embodiments of the invention and are not to be construed to limit the invention in any manner. In the following examples, all amounts are expressed as parts by weight, unless otherwise stated.

EXAMPLE 1

Various coating formulations were prepared by admixing the components listed in the tables below with sufficient solvent to produce a liquid coating composition having about 50 weight percent solids. The coatings were applied onto Bonderite® 1000 CRS panels (ACT Laboratories, Inc., Hillsdale, Mich.) and, after about 5 minutes at room temperature to flash off some of the volatiles, the coated panels were heated to the indicated bake temperature for curing. Upon cure, the panels were cooled to room temperature and the film and resistance properties were determined. The results are summarized in Tables 1 to 6.

TABLE 1

Cure Response of Synthacryl ® VCS 1436/Triazine Carbamate Coatings

|  | A | B | C |
|---|---|---|---|
| Coatings |  |  |  |
| Synthacryl ® VCS 1436 Resin(60 wt % in MIBK) | 13.46 | 13.46 | 13.46 |
| Tris-(methoxybutoxycarbonylamino)-1,3,5-triazine (50 wt % in n-Butanol; Methyl to n-Butyl mole ratio: 41/59) | 3.85 | — | 3.85 |
| Benzyltrimethylammonium Acetate (25 wt % in Xylene/MIBK/Arcosolv ® PM Acetate, weight ratio of 1:1:1) | 0.60 | 0.60 | — |
| Dow Corning Paint Additive 57 (10 wt % in Arcosolv ® PM Acetate) | 0.05 | 0.05 | 0.05 |
| Solvent: Xylene/MIBK/Arcosolv ® PM Acetate, weight ratio of 1:1:1 | 2.00 | 2.50 | 2.60 |

TABLE 1-continued

Cure Response of Synthacryl ® VCS 1436/Triazine Carbamate Coatings

|  | A | B | C |
|---|---|---|---|
| Coating performance (125° C./30 minutes bake) |  |  |  |
| Film thickness, mils | 1.5 | 1.4 | 1.3 |
| Film hardness, KHN$_{25}$ | 17.8 | 17.8 | 16.2 |
| Pencil hardness | 2H-3H | F-H | 2B-B |
| MEK rubs | 25/200+ | 5/75 | 1/5 |
| Coating Performance (140° C./30 min bake) |  |  |  |
| Film thickness, mils | 1.4 | 1.3 | 1.0 |
| Film hardness, KHN$_{25}$ | 18.6 | 17.6 | 16.2 |
| Pencil hardness | 2H-3H | F-H | 2B-B |
| MEK rubs | 200/200+ | 5/100 | 1/5 |

TABLE 2

Acid Etch Resistance of Synthacryl ® VCS 1436/Triazine Carbamate Coatings

| Coating | D |
|---|---|
| Synthacryl ® VCS 1436 Resin (60 wt % in MIBK) | 26.92 |
| Tris-(methoxybutoxycarbonylamino)-1,3,5-triazine (50 wt % in n-Butanol; Methyl to n-Butyl mole ratio: 41/59) | 19.25 |
| Benzyltrimethylammonium Acetate (25 wt % in Xylene/MIBK/Arcosolv ® PM Acetate, weight ratio of 1:1:1) | 1.2 |
| Cyagard ® UV 1164 light stabilizer (20 wt % in Xylene/MIBK/Arcosolv ® PM Acetate, weight ratio of 1:1:1) | 2.00 |
| Sanduvor ® 3058 Liquid (10 wt % in Xylene/MIBK/Arcosolv ® PM Acetate, weight ratio of 1:1:1) | 1.00 |
| Dow Corning Paint Additive 57 (10 wt % in Arcosolv ® PM Acetate) | 0.10 |
| Solvents: Xylene/MIBK/Arcosolv ® PM Acetate, weight ratio of 1:1:1 | 1.08 |
| Coating Performance (140° C./30 minutes bake) |  |
| Film thickness, mils | 1.7 |
| Film hardness, KHN$_{25}$ | 17.4 |
| Pencil hardness | 2H-3H |
| MEK rubs | 200+/200+ |
| Acid Etch Resistance Test[1] |  |
| Acid Used | Extent of Attack |
| 0.1N H$_2$SO$_4$ (aq) | 1 |
| 0.1N H$_3$PO$_4$ (aq) | 0 |
| 0.1N NaOH (aq) | 0 |
| 100 ppm H$_2$SO$_4$ (aq) | 0 |
| Ford #24 Acid[1] | 2 |

[1]The Ford #24 Acid used for the environmental etch resistance test was prepared by admixing the following ingredients in the indicated amounts: (a) 90 weight % aqueous formic acid: 47 grams; (b) 10 weight % aqueous solution of tannic powder: 24 grams; (c) honey: 24 grams; and (d) 10 weight % aqueous solution of albumin: 5 grams. The acid solution prepared in this manner (4 drops) and the coating were contacted and baked at 60° C. for 30 minutes. Thereafter, on a scale of 0 to 10, with 0 corresponding to no attack and 10 corresponding to severe attack, a numerical value was assigned indicating the extent of attack on the coating by the acid. Effect of the other acids were determined in the same manner.

TABLE 3

Catalysts for Almatex ® PD 7610/Triazine Carbamate Coatings

|  | E | F | G | H |
|---|---|---|---|---|
| Coating | | | | |
| Almatex ® PD 7610 Resin (60 wt % in MIBK) | 13.46 | 13.46 | 13.46 | 13.46 |
| Tris-(methoxybutoxycarbonylamino)-1,3,5-triazine (50 wt % in n-Butanol; Methyl to n-Butyl mole ratio: 41/59) | 3.85 | 3.85 | 3.85 | 3.85 |
| Benzyltrimethylammonium Acetate (25 wt % in Xylene/MIBK/Arcosolv ® PM Acetate, weight ratio of 1:1:1) | 0.60 | — | — | — |
| 1,4-Diazabicyclo[2.2.2]octane (20 wt % in Xylene/MIBK/Arcosolv ® PM Acetate, weight ratio of 1:1:1) | — | 0.75 | — | — |
| Tetrabutylammonium Acetate (20 wt % in Xylene/MIBK/Arcosolv ® PM Acetate, weight ratio of 1:1:1) | — | — | 0.75 | — |
| Tetrabutylammonium Bromide (20 wt % in Xylene/MIBK/Arcosolv ® PM Acetate, weight ratio of 1:1:1) | — | — | — | 0.75 |
| Dow Corning Paint Additive 57 (20 wt % in Arcosolv ® PM Acetate) | 0.10 | 0.10 | 0.10 | 0.10 |
| Solvents: Xylene/MIBK/Arcosolv ® PM Acetate, weight ratio of 1:1:1 | 1.99 | 1.84 | 1.84 | 1.84 |
| Coating Performance | | | | |
| Bake Schedule, °C./min | 125/30 | 125/30 | 120/30 | 120/30 |
| Film thickness, mils | 1.6 | 1.5 | 1.5 | 1.5 |
| Film hardness, $KHN_{25}$ | 17.2 | 16.2 | 17.6 | 17.6 |
| Pencil hardness | 2H-3H | H-2H | 2H-3H | 2H-3H |
| MEK rubs | 100/200+ | 50/200+ | 75/200+ | 75/200+ |

TABLE 4

Epon ® 828 Coatings With and Without Triazine Carbamate

|  | I | J |
|---|---|---|
| Coating | | |
| Epon ® 828 resin | 6.1 | 6.1 |
| Tris-(methoxybutoxycarbonylamino)-1,3,5-triazine (50 wt % in n-Butanol; Methyl to n-Butyl mole ratio: 41/59) | 7.8 | — |
| Benzyltrimethylammonium Acetate (25 wt % in Xylene/MIBK/Arcosolv ® PM Acetate, weight ratio of 1:1:1) | 0.3 | 0.3 |
| Dow Corning Paint Additive 57 (10 wt % in Arcosolv ® PM Acetate) | 0.1 | 0.1 |
| Solvents: Xylene/MIBK/Arcosolv ® PM Acetate, weight ratio of 1:1:1 | 5.7 | 13.5 |
| Coating Performance (110° C./30 minutes Bake) | | |
| Film thickness, mils | 1.0 | 1.0 |
| Film hardness, $KHN_{25}$ | 20 | <1 |
| Pencil hardness | H-2H | 3B-2B |
| MEK rubs | 50/200+ | 1/20 |
| Coating Performance (125° C./30 minutes Bake) | | |
| Film thickness, mils | 1.0 | 1.0 |
| Film hardness, $KHN_{25}$ | 20 | 2.5 |
| Pencil hardness | 3H-4H | 2B-B |
| MEK rubs | 200+/200+ | 10/50 |

TABLE 5

Effect of Catalyst Levels on Epon ® 828/Triazine Carbamate Coatings

|  | K | L | M |
|---|---|---|---|
| Coatings | | | |
| Epon ® 828 resin | 6.1 | 6.1 | 6.1 |
| Tris-(methoxybutoxycarbonylamino)-1,3,5-triazine (50 wt % in n-Butanol; Methyl to n-Butyl mole ratio: 41/59) | 7.8 | 7.8 | 7.8 |
| Benzyltrimethylammonium Acetate (25 wt % in Xylene/MIBK/Arcosolv ® PM Acetate, weight ratio of 1:1:1) | 1.2 | 0.6 | 0.3 |
| Dow Corning Paint Additive 57 (10 wt % Arcosolv ® PM Acetate) | 0.1 | 0.1 | 0.1 |
| Solvents: Xylene/MIBK/Arcosolv ® PM Acetate, weight ratio of 1:1:1 | 3.6 | 4.2 | 4.5 |
| Coating Performance (100° C./30 minutes Bake) | | | |
| Film thickness, mils | 1.0 | 1.0 | 1.0 |
| Film hardness, $KHN_{25}$ | 19.8 | 19.6 | 5.5 |
| Pencil hardness | 2H-3H | 2B-B | 3B-2B |
| MEK rubs | 50/200+ | 1/10 | 1/10 |
| Coating Performance (110° C./30 minutes Bake) | | | |
| Film thickness, mils | 1.0 | 1.0 | 1.0 |
| Film hardness, $KHN_{25}$ | 20.9 | 20.6 | 20.4 |
| Pencil hardness | 3H-4H | 3H-4H | 3H-4H |
| MEK rubs | 200+/200+ | 200+/200+ | 50/200+ |

TABLE 5-continued

Effect of Catalyst Levels on Epon ® 828/Triazine Carbamate Coatings

|  | K | L | M |
|---|---|---|---|
| Coating Performance (125° C./30 minutes Bake) | | | |
| Film thickness, mils | 1.0 | 0.9 | 0.95 |
| Film hardness, KHN$_{25}$ | 22.0 | 23.0 | 22.0 |
| Pencil hardness | 3H-4H | 3H-4H | 3H-4H |
| MEK rubs | 200+/200+ | 200+/200+ | 200+/200+ |

TABLE 6

Synocure ® 888 H/Triazine Carbamate Coatings

|  | N | O |
|---|---|---|
| Coatings | | |
| Synocure ® 888 H resin | 65 | 100 |
| Tris-(methoxybutoxycarbonylamino)-1,3,5-triazine (50 wt % in n-Butanol; Methyl to n-Butyl mole ratio: 41/59) | 70 | — |
| Benzyltrimethylammonium Acetate (25 wt % in Xylene/MIBK/Arcosolv ® PM Acetate, weight ratio of 1:1:1) | 6.0 | 6.0 |
| Dow Corning Paint Additive 57 (10 wt % Arcosolv ® PM Acetate) | 1.0 | 1.0 |
| Solvents: Xylene/MIBK/Arcosolv ® PM Acetate, weight ratio of 1:1:1 | 43.2 | 78.2 |
| Coating Performance (100° C./30 minutes Bake) | | |
| Film thickness, mils | 1.48 | no cure |
| Film hardness, KHN$_{25}$ | 11.5 | no cure |
| MEK rubs | 125/200+ | no cure |
| Coating Performance (125° C./30 minutes Bake) | | |
| Film thickness, mils | 1.57 | no cure |
| Film hardness, KHN$_{25}$ | 15.4 | no cure |
| MEK rubs | 200+/200+ | no cure |
| Coating Performance (140° C./30 minutes Bake) | | |
| Film thickness, mils | 1.55 | no cure |
| Film hardness, KHN$_{25}$ | 18.4 | no cure |
| MEK rubs | 200+/200+ | no cure |

EXAMPLE 2

Coatings with EPON® 828 Resin and tris-(butoxycarbonylamino)-1,3,5-triazine Cured with tetrabutyl diacetoxy distannoxane (TK-1)

EPON® 828 resin (5.7 g) was added to the triazine carbamate (4.26 g) dissolved in 1-methoxy-2-propanol (6.0 g). The mixture was warmed on a hot water bath and to the clear solution TK-1 catalyst (0.200 g) was added. After vigorous agitation for a few minutes, the mixture was applied to Bonderite® 1000 steel panels using a #40 wire cator applicator. The panels so prepared were heated at 150° C. for 30 minutes to obtain fully cured coatings having 200+/200+ MEK double rubs (no marring).

COMPARATIVE EXAMPLE 1

Attempted Preparation of Coatings with EPON® 828 Resin with Catalyst

EPON® 828 resin (10.0 g) was dissolved in 1-methoxy-2-propanol (6.0 g). The mixture was warmed on a hot water bath and to the solution TK-1 catalyst (0.200 g) was added. After vigorous agitation for a few minutes, the solution was applied to Bonderite® 1000 steel panels using a #40 wire cator applicator, and the panels so prepared were heated at 180° C. for 30 minutes. Cured coatings were not formed, indicating that EPON® 828 did not produce cured coatings in the presence of a catalyst under the conditions of Example 2 without the presence of the triazine carbamate crosslinker.

EXAMPLE 3

Coatings with EPON® 828 Resin and tris-(butoxycarbonylamino)-1,3,5-triazine Cured with dimethyltin dilaurate (UL-28)

EPON® 828 resin (5.7 g) was added to the triazine carbamate (4.26 g) dissolved in 1-methoxy-2-propanol (6.0 g). The mixture was warmed on a hot water bath and to the clear solution UL-28 catalyst (0.200 g) was added. After vigorous agitation for a few minutes, the mixture was applied to Bonderite® 1000 steel panels using a #40 wire cator applicator. The panels so prepared were heated at 180° C. for 30 minutes to obtain fully cured coatings having 200+/200+ MEK double rubs (no marring).

EXAMPLE 4

Coatings with EPON® 828 Resin and tris-(butoxycarbonylamino)-1,3,5-triazine Cured without Catalyst EPON® 828 resin (5.7 g) was added to the triazine carbamate (4.26 g) dissolved in 1-methoxy-2-propanol (6.0 g). The mixture was warmed on a hot water bath with vigorous agitation for a few minutes and applied to Bonderite® 1000 steel panels using a #40 wire cator applicator. The panels so prepared were heated at 180° C. for 30 minutes to obtain fully cured coatings having 200+/200+ MEK double rubs (no marring).

COMPARATIVE EXAMPLE 2

Attempted Preparation of Coatings with EPON® 828 Resin without catalyst

EPON® 828 resin (10.0 g) was dissolved in 1-methoxy-2-propanol (6.0 g). The mixture was warmed on a hot water bath with vigorous agitation for a few minutes. The solution was applied to Bonderite® 1000 steel panels using a #40 wire cator applicator, and the panels so prepared were heated at 180° C. for 30 minutes. Upon the first MEK rub, the coating was removed indicating that EPON® 828 by itself did not produce cured coatings under the conditions of Example 4 without the presence of the triazine carbamate crosslinker.

EXAMPLE 5

A white pigmented powder coating composition containing ingredients listed in Table 7 was formulated. The ingredients were premixed in a Waring blender, melt-mixed on a Brabender two-roll mill, crushed in a Waring blender, milled in a Mikro-ACM mill classifier and sprayed electrostatically onto Bonderite® 1000 steel panels with a Wagner gun. The resulting powder coating was cured by heating at the specified temperature and time. The results are summarized in Table 7.

TABLE 7

Preparation of Powder Coatings with
Tris-(butoxycarbonylamino)-1,3,5-triazine

| Coating | P |
| --- | --- |
| Epon ® 1007 F resin | 85 |
| tris-(butoxycarbonylamino)-1,3,5-triazine | 15 |
| Tetrabutyl diacetoxy distannoxane (TK-1) | 0.20 |
| Benzoin | 1.4 |
| R 960 pigment (TiO$_2$) | 40.0 |
| Resiflow P-67 flow control agent | 1.3 |

| Coating Performance | 150° C./20 min. bake | 190° C./20 min. Bake |
| --- | --- | --- |
| Film thickness, mils | 4.0–5.2 | 2.4–8.0 |
| Film hardness, KHN$_{25}$ | 12.4 | 12.7 |
| Pencil hardness | H-2H | H-2H |
| MEK rubs | 200+/200+ | 200+/200+ |
| Film appearance | Tight orange peel Surface not well wetted | Tight orange peel Surface not well wetted |
| Impact F/R (in. lbs) | 40/5- | 20/5- |
| Yellow index | −1.08 | 0.18 |
| Gloss | | |
| 60 degrees | 53.4 | 13.3 |
| 20 degrees | 12.7 | 3.5 |
| Gel time (seconds) | 50 | 50 |
| Gel temperature (°C.) | 200 | 200 |
| Vertical plate flow: | | |
| Distance (cm) | 2.0 | 2.0 |
| Temperature (°C.) | 190 | 190 |
| Time (min.) | 20 | 20 |

Although the present invention is described with reference to certain preferred embodiments, it is apparent that variations and modifications thereto may be made by those of ordinary skill in the art without departing from the scope of this invention as defined by the appended claims.

We claim:

1. A curable composition, comprising:
   (1) a resin component comprising a polyfunctional epoxy compound containing, on average, at least two epoxy functionalities per molecule, such polyfunctional epoxy compound being a copolymer of an epoxy group containing unsaturated monomer with an unsaturated comonomer which does not contain epoxy groups; and
   (2) a crosslinker component comprising a 1,3,5-triazine carbamate of the following general formula, as well as oligomers thereof:

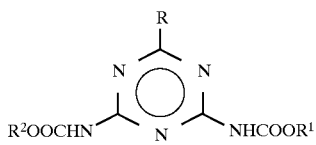

wherein R is selected from the group consisting of —NHCOOR$^3$, hydrogen, hydrocarbyl, hydrocarbyloxy, hydrocarbylthio, amido, sulfonamido, amino, hydrocarbylamino, dihydrocarbylamino and cyclic amino; and wherein each R$^1$, R$^2$ and R$^3$ is independently selected from the group consisting of hydrocarbyl and hydrocarbyloxyhydrocarbyl;
   wherein the resin component and the crosslinker component are present in an epoxy:carbamate equivalents ratio of from about 0.5:1 to about 2:1.

2. A coating composition, comprising:
   (1) a resin component comprising a polyfunctional epoxy compound containing, on average, at least two epoxy functionalities per molecule, such polyfunctional epoxy compound being a copolymer of an epoxy group containing unsaturated monomer with an unsaturated comonomer which does not contain epoxy groups; and
   (2) a crosslinker component comprising a 1,3,5-triazine carbamate of the following general formula, as well as oligomers thereof:

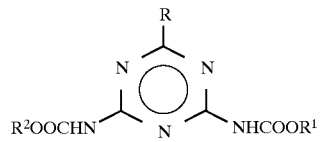

wherein R is selected from the group consisting of —NHCOOR$^3$, hydrogen, hydrocarbyl, hydrocarbyloxy, hydrocarbylthio, amido, sulfonamido, amino, hydrocarbylamino, dihydrocarbylamino and cyclic amino; and wherein each R$^1$, R$^2$ and R$^3$ is independently selected from the group consisting of hydrocarbyl and hydrocarbyloxyhydrocarbyl;
   wherein the resin component and the crosslinker component are present in an epoxy:carbamate equivalents ratio of from about 0.5:1 to about 2:1.

3. A method of coating a substrate, comprising the steps of:
   (A) applying to the substrate a curable composition, comprising:
      (1) a resin component comprising a polyfunctional epoxy compound containing, on average, at least two epoxy functionalities per molecule, such polyfunctional epoxy compound being a copolymer of an epoxy group containing unsaturated monomer with an unsaturated comonomer which does not contain epoxy groups; and
      (2) a crosslinker component comprising a 1,3,5-triazine carbamate of the following general formula, as well as oligomers thereof:

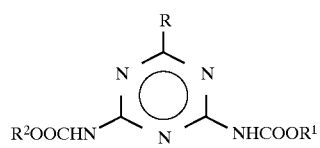

wherein R is selected from the group consisting of —NHCOOR$^3$, hydrogen, hydrocarbyl, hydrocarbyloxy, hydrocarbylthio, amido, sulfonamido, amino, hydrocarbylamino, dihydrocarbylamino and cyclic amino; and wherein each R$^1$, R$^2$ and R$^3$ is independently selected from the group consisting of hydrocarbyl and hydrocarbyloxyhydrocarbyl; then
   (B) curing the so applied curable composition to form a crosslinked film;
   wherein the resin component and the crosslinker component are present in an epoxy:carbamate equivalents ratio of from about 0.5:1 to about 2:1.

4. The curable composition of claim 1, wherein R is —NHCOOR$^3$, and R$^1$, R$^2$ and R$^3$ are each independently an alkyl group of 1 to 8 carbon atoms.

5. The curable composition of claim 1, wherein the crosslinker component further comprises a co-crosslinker selected from the group consisting of aminoplast resins, blocked polyfunctional isocyanates, unblocked polyfunctional isocyanates, polyamines and polyacids.

6. The curable composition of claim 1, wherein the polyfunctional epoxy compound is a bisepoxide selected from glycidyl ethers of dihydric phenols.

7. The curable composition of claim 1, wherein the resin component further comprises a polyfunctional active hydrogen group containing compound.

8. The curable composition of claim 1, further comprising a cure catalyst.

9. The curable composition of claim 8, wherein the cure catalyst is selected from the group consisting of a basic catalyst, an organometallic catalyst and an acidic catalyst.

10. The curable composition of claim 9, wherein the cure catalyst is a basic catalyst selected from the group consisting of quaternary onium compounds and salts thereof.

11. The curable composition of claim 9, wherein the cure catalyst is an organometallic catalyst selected from organotin compounds.

12. The curable composition of claim 1, wherein the resin component and the crosslinker component are present in an epoxy:carbamate equivalents ratio of from about 0.8:1 to about 1.2:1.

13. The curable composition of claim 1, further comprising a light stabilizer selected from the group consisting of a UV absorber, a hindered amine light stabilizer and mixtures thereof.

14. The curable composition of claim 1, further comprising a light stabilizer selected from the group consisting of a hydroxy aryl triazine UV absorber, a hindered amine light stabilizer and mixtures thereof.

15. The coating composition of claim 2, wherein the coating is a liquid coating comprising an organic solvent.

16. The coating composition of claim 15, wherein the coating is a liquid coating comprising water as the liquid medium.

17. The coating composition of claim 2, wherein the coating is in the form of a powder coating.

18. The coating composition of claim 2, wherein R is —NHCOOR$^3$, and R$^1$, R$^2$ and R$^3$ are each independently an alkyl group of 1 to 8 carbon atoms.

19. The coating composition of claim 2, wherein the crosslinker component further comprises a co-crosslinker selected from the group consisting of aminoplast resins, blocked polyfunctional isocyanates, unblocked polyfunctional isocyanates, polyamines and polyacids.

20. The coating composition of claim 2, wherein the polyfunctional epoxy compound is a bisepoxide selected from glycidyl ethers of dihydric phenols.

21. The coating composition of claim 2, wherein the resin component further comprises a polyfunctional active hydrogen group containing compound.

22. The coating composition of claim 2, further comprising a cure catalyst.

23. The coating composition of claim 22, wherein the cure catalyst is selected from the group consisting of a basic catalyst, an organometallic catalyst and an acidic catalyst.

24. The coating composition of claim 23, wherein the cure catalyst is a basic catalyst selected from the group consisting of quaternary onium compounds and salts thereof.

25. The coating composition of claim 23, wherein the cure catalyst is an organometallic catalyst selected from organotin compounds.

26. The coating composition of claim 2, wherein the resin component and the crosslinker component are present in an epoxy:carbamate equivalents ratio of from about 0.8:1 to about 1.2:1.

27. The coating composition of claim 2, further comprising a light stabilizer selected from the group consisting of a UV absorber, a hindered amine light stabilizer and mixtures thereof.

28. The coating composition of claim 2, further comprising a light stabilizer selected from the group consisting of a hydroxy aryl triazine UV absorber, a hindered amine light stabilizer and mixtures thereof.

29. The method of claim 3, wherein R is —NHCOOR$^3$, and R$^1$, R$^2$ and R$^3$ are each independently an alkyl group of 1 to 8 carbon atoms.

30. The method of claim 3, wherein the crosslinker component further comprises a co-crosslinker selected from the group consisting of aminoplast resins, blocked polyfunctional isocyanates, unblocked polyfunctional isocyanates, polyamines and polyacids.

31. The method of claim 3, wherein the polyfunctional epoxy compound is a bisepoxide selected from glycidyl ethers of dihydric phenols.

32. The method of claim 3, wherein the resin component further comprises a polyfunctional active hydrogen group containing compound.

33. The method of claim 3, wherein the curable composition further comprises a cure catalyst selected from the group consisting of a basic catalyst, an organometallic catalyst and an acidic catalyst.

34. The method of claim 33, wherein the cure catalyst is a basic catalyst selected from the group consisting of quaternary onium compounds and salts thereof.

35. The method of claim 33, wherein the cure catalyst is an organometallic catalyst selected from organotin compounds.

36. The method of claim 3, wherein the resin component and the crosslinker component are present in an epoxy:carbamate equivalents ratio in the range of from about 0.8:1 to about 1.2:1.

37. The method of claim 3, wherein the curable composition further comprises a light stabilizer selected from the group consisting of a UV absorber, a hindered amine light stabilizer and mixtures thereof.

38. The method of claim 37, wherein the light stabilizer selected from the group consisting of a hydroxy aryl triazine UV absorber, a hindered amine light stabilizer and mixtures thereof.

39. A substrate coated with a crosslinked film derived from a curable composition, comprising:

(1) a resin component comprising a polyfunctional epoxy compound containing, on average, at least two epoxy functionalities per molecule, such polyfunctional epoxy compound being a copolymer of an epoxy group containing unsaturated monomer with an unsaturated comonomer which does not contain epoxy groups; and (2) a crosslinker component comprising a 1,3,5-triazine carbamate of the following general formula, as well as oligomers thereof:

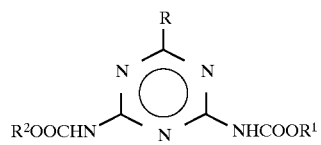

wherein R is selected from the group consisting of —NHCOOR$^3$, hydrogen, hydrocarbyl, hydrocarbyloxy, hydrocarbylthio, amido, sulfonamido, amino, hydrocarbylamino, dihydrocarbylamino and cyclic amino; and wherein each R$^1$, R$^2$ and R$^3$ is independently selected from the group consisting of hydrocarbyl and hydrocarbyloxyhydrocarbyl;

wherein the resin component and the crosslinker component are present in an epoxy:carbamate equivalents ratio of from about 0.5:1 to about 2:1.

40. The coated substrate of claim 39, wherein R is —NHCOOR$^3$, and R$^1$, R$^2$ and R$^3$ are each independently an alkyl group of 1 to 8 carbon atoms.

41. The coated substrate of claim 39, wherein the crosslinker component further comprises a co-crosslinker selected from the group consisting of aminoplast resins, blocked polyfunctional isocyanates, unblocked polyfunctional isocyanates, polyamines and polyacids.

42. The coated substrate of claim 39, wherein the polyfunctional epoxy compound is a bisepoxide selected from glycidyl ethers of dihydric phenols.

43. The coated substrate of claim 39, wherein the resin component further comprises a polyfunctional active hydrogen group containing compound.

44. The coated substrate of claim 39, wherein the curable composition further comprises a cure catalyst selected from the group consisting of a basic catalyst, an organometallic catalyst and an acidic catalyst.

45. The coated substrate of claim 44, wherein the cure catalyst is a basic catalyst selected from the group consisting of quaternary onium compounds and salts thereof.

46. The coated substrate of claim 44, wherein the cure catalyst is an organometallic catalyst selected from organotin compounds.

47. The coated substrate of claim 39, wherein the resin component and the crosslinker component are present in an epoxy:carbamate equivalents ratio in the range of from about 0.8:1 to about 1.2:1.

48. The coated substrate of claim 39, wherein the curable composition further comprises a light stabilizer selected from the group consisting of a UV absorber, a hindered amine light stabilizer and mixtures thereof.

49. The coated substrate of claim 48, wherein the light stabilizer selected from the group consisting of a hydroxy aryl triazine UV absorber, a hindered amine light stabilizer and mixtures thereof.

* * * * *